Patented Jan. 4, 1938

2,104,501

UNITED STATES PATENT OFFICE 2,104,501

MANUFACTURE AND USE OF SYNTHETIC RESINS

Basil Albert Adams and Eric Leighton Holmes, Teddington, England

No Drawing. Application October 25, 1935, Serial No. 46,823. In Great Britain November 13, 1934

9 Claims. (Cl. 252—2)

This invention relates to the treatment of liquids to effect the removal therefrom of particular components or constituents by adsorption and in particular to effect the removal of certain cations and optionally the replacement thereof by other cations as in base exchanging processes, and to processes involving the absorption of gases and vapours, for example ammonia, triethylamine, carbon dioxide, sulphuretted hydrogen and ethylene, and to the manufacture of synthetic resins adapted for use more particularly for the purposes indicated.

The invention is based, broadly, upon the discovery that the condensation products including those already known obtained by the interaction of formaldehyde or equivalent methylene bodies with polyhydric phenolic bodies and in particular polyhydric phenols and their derivatives, especially catechol and other tannins, have what are generally known as base-exchange properties.

The expression "polyhydric phenolic bodies" is used herein as signifying polyhydric phenols as well as their derivatives and tannins.

By the expression "tannins", as used herein, is meant not only the natural products but also the synthetic materials, especially those prepared from phenols and their derivatives as referred to later.

As used herein the expression "methylene body" means formaldehyde itself or any of the bodies which may be regarded as the equivalents of formaldehyde in their reactivity with phenolic bodies in the production of resin-like products.

The invention is based upon the further observation that while the resins formed by condensing monohydric phenols with formaldehyde or an equivalent methylene body in the absence of polyhydric phenols have on a weight basis, negligible base exchange properties, the base exchange properties of resins formed by condensing simultaneously monohydric phenols and polyhydric phenols or their derivatives, and especially catechol and other tannins with formaldehyde or other methylene body, are notable, and the mixed resins thus obtained do not show that solubility in caustic alkalis that might be expected from the presence of a condensation product from a monohydric phenol.

The property of removing particular components or constituents from liquids by adsorption and in particular the base exchanging properties and the properties of absorbing gases and vapours is found in resins prepared from polyhydric phenols or tannins alone or in association with monohydric phenols by the employment of any catalyst, acidic or basic, or without a catalyst, and to the greatest extent in resins prepared with more than one molecular proportion of formaldehyde or equivalent methylene body.

The invention consists in the process of treating liquids to effect the removal therefrom of particular components or constituents by adsorption or absorption, and in particular to effect the removal of certain cations and optionally the replacement thereof by other cations as in base exchanging processes by the employment of synthetic resins obtained by the condensation of polyhydric phenols or their derivatives or tannins alone or in association with monohydric phenols with formaldehyde or an equivalent methylene body.

The invention also consists in processes for the absorption of gases and vapours which comprise subjecting the materials containing such gases or vapours to the action of synthetic resins obtained by the condensation of polyhydric phenols or their derivatives or tannins alone or in association with monohydric phenols with formaldehyde or an equivalent methylene body.

The invention more particularly extends to the employment for the purpose in question of synthetic resins obtained by the condensation with formaldehyde or an equivalent methylene body or mixtures of formaldehyde and an equivalent methylene body, of mixtures of bodies falling within one or more of the following classes, namely polyhydric phenols, derivatives of polyhydric phenols and tannins together with or in the absence of monohydric phenols.

For the purpose of illustration, the following description is furnished to assist in the explanation of the invention:—

According to one method, materials were prepared by adding a mixture of formalin (100 cc.) and hydrocloric acid (30 cc. conc.) to a boiling solution of the particular phenol or tannin (50 g.) dissolved in a litre of water or alcohol or water-alcohol mixture. The heating was continued until the resin was completely precipitated, after which it was filtered, washed with alcohol and ether and finally dried at 50° C., in vacuum. The precipitate or gel may also be dried without filtering at 100° C. or at room temperature with or without vacuum and then washed free from impurities. The resin from tannic acid was too fine to allow easy passage of solutions and was accordingly prepared by precipitation in the presence of silica by adding about a litre of 12% water glass before the hydrochloric acid, (increased to 300 cc.) and the formalin were added to the phenol solution. After a preliminary drying the resin-silica gel was easier to wash free from sodium chloride.

For the purposes of the invention, it has been found that the resins obtained from catechol tannins are particularly useful. These tannins condense with formaldehyde in the presence of acid to yield insoluble material which usually separates as a flocculent precipitate. It has been found that some of these products, particularly those from quebracho tannin can also be obtained in jelly form which dries to very hard lumps, eminently suitable for use as filter media. Any soluble material can then be removed before using by washing with alkali, then acid, then water. These materials possess adsorptive powers for many metallic ions from alkaline, neutral, or slightly acidic aqueous and other solutions. For instance, such condensation products or synthetic resins, treated with a calcium chloride solution will adsorb a certain amount of calcium, which cannot be removed by washing with water but can be removed by washing either with dilute acid such as 5% hydrochloric acid or with an excess of not too weak sodium chloride solution such as 5%, in which case sodium replaces the calcium. Such condensation products will further adsorb sodium direct from a common salt solution and this sodium can be replaced by calcium and magnesium even when in very dilute solution, such as tap water. These condensation products like the majority of the others referred to, when prepared with more than one molecular proportion of formaldehyde are insoluble in water and in organic liquids and are also stable to and most of them insoluble in both aqueous acids and alkalis. The gallic and tannic acid resins are among the few soluble in alkalis.

The resins were found to adsorb cations from neutral, alkaline or slightly acid solutions. Such adsorbed ions were recoverable by subsequent treatment of the resin with a dilute acid (e. g. 5% hydrochloric acid) or with a salt solution (e. g. 5% sodium chloride) the latter being chosen so as to give a soluble salt of the adsorbed metal.

The following examples are given by way of illustration, but not as necessarily limiting the scope of the invention, for the purpose of indicating the properties of typical resins including certain mixed resins and their applications as adsorbents or absorbents:—

Example I.—Iron

A solution containing 5.5 parts per million of iron, as ferric chloride, was passed through 10 cc. of the various resins at a rate of 200 cc. an hour (=20,000 litres per c. metre) and it was found that while catechol, resorcinol, quinol, and pyrogallol resins removed little, if any, iron, phloroglucinol resin purified about 8 litres, tannic acid/silica resin 22.4 litres and quebracho tannin resin about 20 litres. The regeneration of the resin was effected by 5% hydrochloric acid, 22.4 litres of the original solution contained 0.133 gram of iron and the filtrate resulting from the regeneration of the tannic acid/silica resin contained the same amount.

About two litres of the following solutions, each containing an equivalent of 5.5 parts of iron per million, were passed through 10 cc. of tannic acid/silica resin:—ferrous sulphate, ferrous and ferric ammonium sulphates, ferric chloride solutions also containing 100 parts per million of one of the following bodies, namely mallic acid, sucrose, lactose, glucose, gelatine and agar. The iron was completely removed. Similar ferric chloride solutions containing tartaric, citric and mucic acids were not freed from iron though its concentration was diminished. Solutions containing lower concentrations of these three acids, 20 parts per million, were completely freed from iron. Ferric chloride solutions containing sodium salts of the above four acids at a concentration of 100 parts per million, in an alkaline tap water (pH 7.5-8.0) were purified from iron. Hydroxyacids, their salts, carbohydrates and colloids are known to prevent some of the recognized iron-removal processes from working successfully.

For more concentrated saline solutions, the standard ferric chloride solution was used to prepare 5% solutions of sodium chloride, ammonium nitrate, calcium chloride and aluminium sulphate and the removal of iron was complete while a similar 1% sucrose solution was nearly freed from iron though a 0.1% gelatine was unaffected.

Example II.—Calcium

A solution containing 10.08 grams of calcium sulphate in 20 litres of water was passed through 10 grams of the various resins. Phloroglucinol resin removed the calcium from 200 cc., and quebracho tannin resin from 600 cc. of the solution. Using the calcium sulphate solution diluted 10 times, it was found that catechol resin, tannic acid resin, phloroglucinol resin, removed the calcium from 500 cc., 500 cc., and 2500 cc., of the solution respectively.

Example III.—Bismuth

Bismuth nitrate was dissolved in a small amount of nitric acid and diluted to 20 litres, and the resulting solution contained 0.54 gram of bismuth per litre, and had a pH of 1.7 approximately. The various resins removed bismuth from the following volumes of this solution:— quinol 100 cc.; gallic acid 150 cc.; 2.7 dihydroxynaphthalene 200 cc.; quebracho tannin 400 cc.; tannic acid 800 cc.; phloroglucinol 1400 cc.; catechol 2200 cc.; catechin 3300 cc. and pyrogallol 4100 cc. The resorcinol resin did not remove bismuth.

Example IV.—Lead

A solution of lead nitrate containing .414 gram of lead per litre was used. Pyrogallol resin, phloroglucinol resin, and quebracho tannin resin removed the lead from the following volumes of this solution, 100 cc., 400 cc., and 730 cc. respectively. In these cases the lead was recovered by the use of 2N acetic acid.

Example V.—Inorganic bases

A solution containing 10 parts per 100,000 of sodium hydroxide was passed through 7 grams of a resorcinol resin and about 3 litres were freed from alkali and had an average pH of 6. Other alkalis such as potash, lime, ammonia, or sodium carbonate were also removed from solution. The dried resin removed ammonia gas from an air stream previously bubbled through strong ammonia solution and dried over quick lime. Treatment with acid regenerated the resin and the acid filtrate contained practically the whole of the sodium, potassium etc. from the used resin. The resin could also be used with stronger solutions, e. g. a 20% solution of NaOH.

Example VI.—Organic bases

A solution of 4 grams of aniline in 4 litres of water was passed through 15 grams of a resorcinol resin and 1.1/2 litres were freed from aniline. Using a similar concentration in alcohol about 700 cc. of solution were freed from aniline. Pyridine was also removed and in about the same amounts from aqueous and alcoholic solutions.

Example VII.—Water softening

Tap water of hardness 20.5 p.p. 100,000 was passed through 10 grams of the resins named in the table below until the water was no longer softened; the resins had previously been treated with aqueous common salt solution. The tannin resins numbered 1–10 were prepared in aqueous solution while those numbered 11–16 were prepared in alcoholic solution.

| | Resin obtained by condensing with formaldehyde of: | Volume of water softened | | |
|---|---|---|---|---|
| | | c.c. | c.c. | c.c. |
| 1 | Larch bark extract | 800 | 700 | 750 |
| 2 | Indian acacia cutch | 850 | 750 | 800 |
| 3 | Gambier | 1000 | 1150 | 1100 |
| 4 | Quebracho-sulphited dried at 100° C. | 1100 | 900 | 1200 |
| 5 | Quebracho unsulphited | 1700 | 1800 | 1900 |
| 6 | Quebracho sulphited dried at 25° C. | 1250 | 1100 | 1250 |
| 7 | Mangrove cutch | 1000 | 950 | 950 |
| 8 | Wattle bark extract | 1000 | 950 | 950 |
| 9 | Wattle bark cubes | 700 | 500 | 500 |
| 10 | Wattle bark powder | 450 | 400 | 350 |
| 11 | Indian acacia cutch | 1300 | 1200 | 1200 |
| 12 | Gambier | 800 | 900 | 850 |
| 13 | Quebracho sulphited | 800 | 850 | 800 |
| 14 | Mangrove cutch | 700 | 750 | 700 |
| 15 | Wattle bark extract | 600 | 800 | 750 |
| 16 | Larch bark extract | 700 | 750 | 800 |

The table shows the amount of water softened in three successive runs. The resins were regenerated between runs by a 5% solution of common salt.

The rate of flow was 200 c.c. per hour in all the examples but this may be varied without substantially altering the efficiency of the process.

Example VIII.—Mixed resins

Mixed resins were prepared by dissolving equal parts by weight of the respective components in about four parts of water and 2 parts of 40% formalin, 0.1 part of concentrated hydrochloric acid solution is added as catalyst and the solution heated on the steam bath until the resin is formed. When it separates from the solution, it is filtered off and dried, but sometimes the whole mass sets to a jelly in which case it is dried direct. The comparative absorptive capacities of these resins may be judged from the following table which indicates the amounts of FeCl₃ solution (0.0035 mol.) and saturated lime water from which the cations were completely removed by 10 grams of each of the resins, sieved through 40 and on 100 mesh:—

| 10 gs. of resin obtained by the condensation with formaldehyde of:— | $Ca^{++}$ | $Fe^{+++}$ |
|---|---|---|
| | c. c. | c. c. |
| m-Cresol-resorcinol | 1400 | Less than 100 |
| m-Cresol-gallic acid | 1000 | 250 |
| m-Cresol-quebracho tannin (sulphited) | 1100 | 100 |
| Syntan resin-quebracho tannin | 2000 | 900 |
| Resorcinol-quebracho tannin | 1200 | 100 |
| Resorcinol-gallic acid | 1400 | 100 |

Syntan has been taken as an example of a synthetic tannin and is a condensation product obtained by treating cresylic acid with sulphuric acid, neutralizing with alkali and then condensing with formaldehyde.

The resins prepared wholly or in part with tannin materials may contain a small amount of iron and other inorganic impurities. These can be removed by treatment with acids, for example, 5 per cent. or stronger hydrochloric acid. Such resins do not reach their maximum capacity until they have been used and regenerated a few times. If, however, the resins after treatment with acid are well washed and then treated with alkalis, preferably dilute, it is found that the resin has its maximum capacity from the start.

The mixed resins and their metallic derivatives like the resins and their metallic derivatives described in our application No. 46822 possess even after exposure to the air considerable powers of absorption for gases and vapours e. g. for ammonia, triethylamine, carbon dioxide, sulphuretted hydrogen and ethylene.

We claim:

1. The process of treating liquids to effect the removal therefrom of particular constituents by adsorption which comprises subjecting the liquid to the action of a synthetic resin obtained by the condensation of a mixture comprising a polyhydric phenolic body and a methylene body.

2. The process of treating liquids to effect the removal therefrom of particular constituents by adsorption which comprises subjecting the liquid to the action of a synthetic resin obtained by the condensation of a polyhydric phenolic body with formaldehyde.

3. The process of treating liquids to effect the removal therefrom of particular constituents by adsorption which comprises subjecting the liquid to the action of a synthetic resin obtained by the condensation of a tannin with a methylene body.

4. The process of treating liquids to effect the removal therefrom of particular constituents by adsorption which comprises subjecting the liquid to the action of a synthetic resin obtained by the condensation of a catechol tannin with a methylene body.

5. The process of treating liquids to effect the removal therefrom of particular constituents by adsorption which comprises subjecting the liquid to the action of a synthetic resin obtained by the condensation of a tannin with formaldehyde.

6. The process of treating liquids to effect the removal therefrom of particular constituents by adsorption which comprises subjecting the liquid to the action of a synthetic resin obtained by the condensation of a catechol tannin with formaldehyde.

7. The process of treating liquids to effect the removal therefrom of particular constituents by adsorption which comprises subjecting the liquid to the action of a synthetic resin obtained by the condensation of a monohydric phenol and a polyhydric phenolic body with formaldehyde.

8. The process of treating liquids to effect the removal therefrom of particular constituents by adsorption which comprises subjecting the liquid to the action of a synthetic resin obtained by the condensation of a monohydric phenol and a tannin with formaldehyde.

9. The process of treating aqueous liquids to effect the removal therefrom of particular cations and the replacement thereof with other cations which comprises subjecting the liquid to the action of a synthetic resin obtained by the condensation of a polyhydric phenolic body with a methylene body and containing such other cations.

BASIL ALBERT ADAMS.
ERIC LEIGHTON HOLMES.